US008752072B2

(12) United States Patent
Goldstein et al.

(10) Patent No.: US 8,752,072 B2
(45) Date of Patent: Jun. 10, 2014

(54) ALTERING EVENT LIFETIMES

(75) Inventors: Jonathan Goldstein, Kirkland, WA (US); Ping Wang, Sammamish, WA (US); Roman Schindlauer, Seattle, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 12/893,775

(22) Filed: Sep. 29, 2010

(65) Prior Publication Data

US 2012/0079506 A1   Mar. 29, 2012

(51) Int. Cl.
G06F 9/44       (2006.01)
G06F 15/16      (2006.01)

(52) U.S. Cl.
USPC .......................................... 719/318; 709/231

(58) Field of Classification Search
USPC .......................................... 719/318; 709/231
See application file for complete search history.

(56) References Cited

U.S. PATENT DOCUMENTS

| 6,973,499 | B1 * | 12/2005 | Peden et al. | 709/229 |
| 7,676,461 | B2 | 3/2010 | Chkodrov | |
| 2008/0263093 | A1 * | 10/2008 | Alcorn et al. | 707/104.1 |
| 2009/0024622 | A1 * | 1/2009 | Chkodrov et al. | 707/6 |
| 2009/0125635 | A1 * | 5/2009 | Barga et al. | 709/231 |
| 2009/0319501 | A1 | 12/2009 | Goldstein | |

OTHER PUBLICATIONS

Andrew B., "Using last occured events from streams" Jun. 25, 2010, 3 pages.
Krishnan, Ramkumar (Ram), et al., "A Hitchiker's Guide to Microsoft StreamInsight Queries", Jun. 7, 2010, 42 pages.
MSDN, "Time Stamp Modifications", Based on information and belief available, at least as early as Aug. 3, 2010, 6 pages.
MSDN, "Count windows", Based on information and belief available, at least as early as Aug. 3, 2010, 3 pages.
MSDN, "Snapshot Windows", Based on information and belief available, at least as early as Aug. 3, 2010, 4 pages.
MSDN, "Using Event Windows", Based on information and belief available, at least as early as Aug. 3, 2010, 4 pages.
MSDN, "Hopping Windows", Based on information and belief available, at least as early as Aug. 3, 2010, 3 pages.

* cited by examiner

Primary Examiner — Andy Ho
Assistant Examiner — Abdou Seye
(74) Attorney, Agent, or Firm — Nicholas Chen; David Andrews; Micky Minhas'

(57) ABSTRACT

The present invention extends to methods, systems, and computer program products for altering event lifetimes. Embodiments of the invention include using operators in an event-processing framework (algebra) to shorten (or "clip") the duration of events. An operator can receive a primary event stream, a clip event stream, and condition as parameters. The operator clips the lifetime of an event in the primary stream to the next event in the clip stream that fulfills the condition. Altering event lifetimes can be used to facilitate cleaning event stream state, converting point events to a continuous signal, and creating and annotating session events.

16 Claims, 9 Drawing Sheets

ALTERING EVENT LIFETIMES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Some distributed systems are event processing systems that process events and take actions based on events. Events typically represent a change in state at some other system, such as, for example, the starting or ending a session, selling an item, open or closing a file, etc. Some event processing systems process multiple streams of event data with the goal of identifying meaningful events within those streams. To identify meaningful events, event processing systems can employ techniques such as detection of complex patterns of many events, event correlation and abstraction, event hierarchies, and relationships between events (e.g., causality, membership, and timing, and event-driven processes).

Within event streams, events typically have a lifetime, determined by a start time and end time. Identifying interesting events, and more specifically matching events from different streams to one another, may require the lifetime of the events to overlap. However, it is not uncommon for an event in one stream to end before a matching event in another stream starts. Further, in some event processing systems, events can be point events where the start time for the event and the end time for the event are the same. Since points events essentially start and end at the same time matching point events from different streams within one another can be difficult.

BRIEF SUMMARY

The present invention extends to methods, systems, and computer program products for altering event lifetimes. In some embodiments, the lifetime of an event in one event stream is adjusted based on an event in another event stream. A first event is received from a first event stream. The first event has a time stamp indicating a start time and end time of the first event. The time from the start time to the end time represents the lifetime of the first event. The first event stream is included in a plurality of event streams. The end time for the first event is altered to extend the lifetime of the first event by a specified period of time.

A second event is received from a second event stream. The second event has a time stamp indicating a start time of the second event. The second event stream is included in the plurality of event stream. It is determined whether there is a correspondence between the first event and the second event based on a defined join condition. The lifetime of the first event is clipped by modifying the first event to end at the start time of the second event. The lifetime of the first event is clipped in response to the defined join condition indicating a correspondence between the first event and the second event.

In other embodiments, state is cleaned from event streams. A first event is received from a first event stream. The first event has a time stamp indicating a start time of the first event. The first event stream is included in a plurality of event streams. The lifetime of the first event is extended for a specified period of time such that the first event starts at the start time of the first event and ends at the specified period of time after the start time of the first event. A second event is received from a second event stream. The second event has a time stamp indicating a start time for the second event. The second event stream is included in the plurality of event streams.

The equivalent of a Left Anti Semi Join ("LASJ") is used to clip the lifetime of the first event by modifying the first event to end at the start time for the second event. Using the equivalent of a LASJ includes extending the lifetime of the second event for an infinite time period. Using the equivalent of a LASJ includes also includes applying an LASJ predicate that detects that the first event and second event satisfy a join condition and that determines the start time for the second event is after the start time for the first event.

It is determined that state can be cleaned for the first and second event streams up to a specified point in time. Determining that state can be cleaned includes receiving a current time increment ("CTI") for the second event stream. The CTI for the second event stream indicates that modifications to events prior to the start time of the second event are no longer to occur in the second event stream. It is determined that the CTI for the second event stream finalizes the second event.

Determining that state can be cleaned includes receiving a current time increment ("CTI") for the first event stream. The CTI for the first event stream indicates that modifications to events prior to the start time of the second event are no longer to occur in the first event stream. Determining that state can be cleaned includes determining, based on the LASJ predicate, that events from the second event stream prior to the start time of the second event are no longer to interact with events in the first event stream.

State for any events prior to the start time of the second event are cleaned from the first and second event streams in response to determining that state can be cleaned form the first and second event streams.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
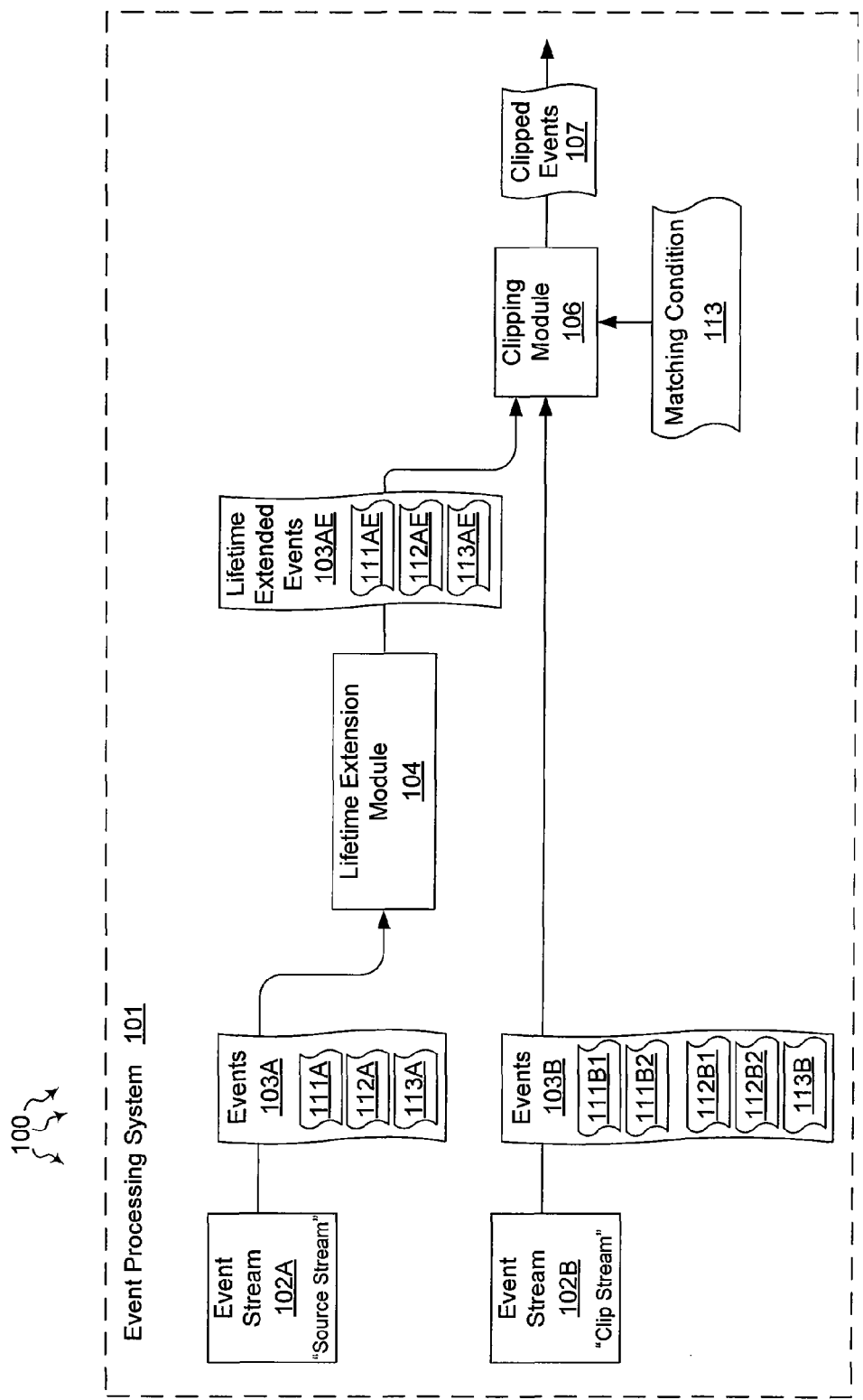
FIG. 1A illustrates an example computer architecture that facilitates altering event lifetimes.

The present invention extends to methods, systems, and computer program products for altering event lifetimes. In some embodiments, the lifetime of an event in one event stream is adjusted based on an event in another event stream. A first event is received from a first event stream. The first event has a time stamp indicating a start time and end time of the first event. The time from the start time to the end time represents the lifetime of the first event. The first event stream is included in a plurality of event streams. The end time for the first event is altered to extend the lifetime of the first event by a specified period of time.

A second event is received from a second event stream. The second event has a time stamp indicating a start time of the second event. The second event stream is included in the plurality of event stream. It is determined whether there is a correspondence between the first event and the second event based on a defined join condition. The lifetime of the first event is clipped by modifying the first event to end at the start time of the second event. The lifetime of the first event is clipped in response to the defined join condition indicating a correspondence between the first event and the second event.

In other embodiments, state is cleaned from event streams. A first event is received from a first event stream. The first event has a time stamp indicating a start time of the first event. The first event stream is included in a plurality of event streams. The lifetime of the first event is extended for a specified period of time such that the first event starts at the start time of the first event and ends at the specified period of time after the start time of the first event. A second event is received from a second event stream. The second event has a time stamp indicating a start time for the second event. The second event stream is included in the plurality of event streams.

The equivalent of a Left Anti Semi Join ("LASJ") is used to clip the lifetime of the first event by modifying the first event to end at the start time for the second event. Using the equivalent of a LASJ includes extending the lifetime of the second event for an infinite time period. Using the equivalent of a LASJ includes also includes applying an LASJ predicate that detects that the first event and second event satisfy a join condition and that determines the start time for the second event is after the start time for the first event.

It is determined that state can be cleaned for the first and second event streams up to a specified point in time. Determining that state can be cleaned includes receiving a current time increment ("CTI") for the second event stream. The CTI for the second event stream indicates that modifications to events prior to the start time of the second event are no longer to occur in the second event stream. It is determined that the CTI for the second event stream finalizes the second event.

Determining that state can be cleaned includes receiving a current time increment ("CTI") for the first event stream. The CTI for the first event stream indicates that modifications to events prior to the start time of the second event are no longer to occur in the first event stream. Determining that state can be cleaned includes determining, based on the LASJ predicate, that events from the second event stream prior to the start time of the second event are no longer to interact with events in the first event stream.

State for any events prior to the start time of the second event are cleaned from the first and second event streams in response to determining that state can be cleaned form the first and second event streams.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1A illustrates an example computer architecture 100 that facilitates altering event lifetimes. Referring to FIG. 1A, computer architecture 100 includes event processing system 101. Event processing system 101 further includes event stream 102A, event stream 102B, lifetime extension module 104, and clipping module 106. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Event streams 102A and 102B can output events 103A and 103B (i.e., corresponding streams of events) respectively.

Figure 2:
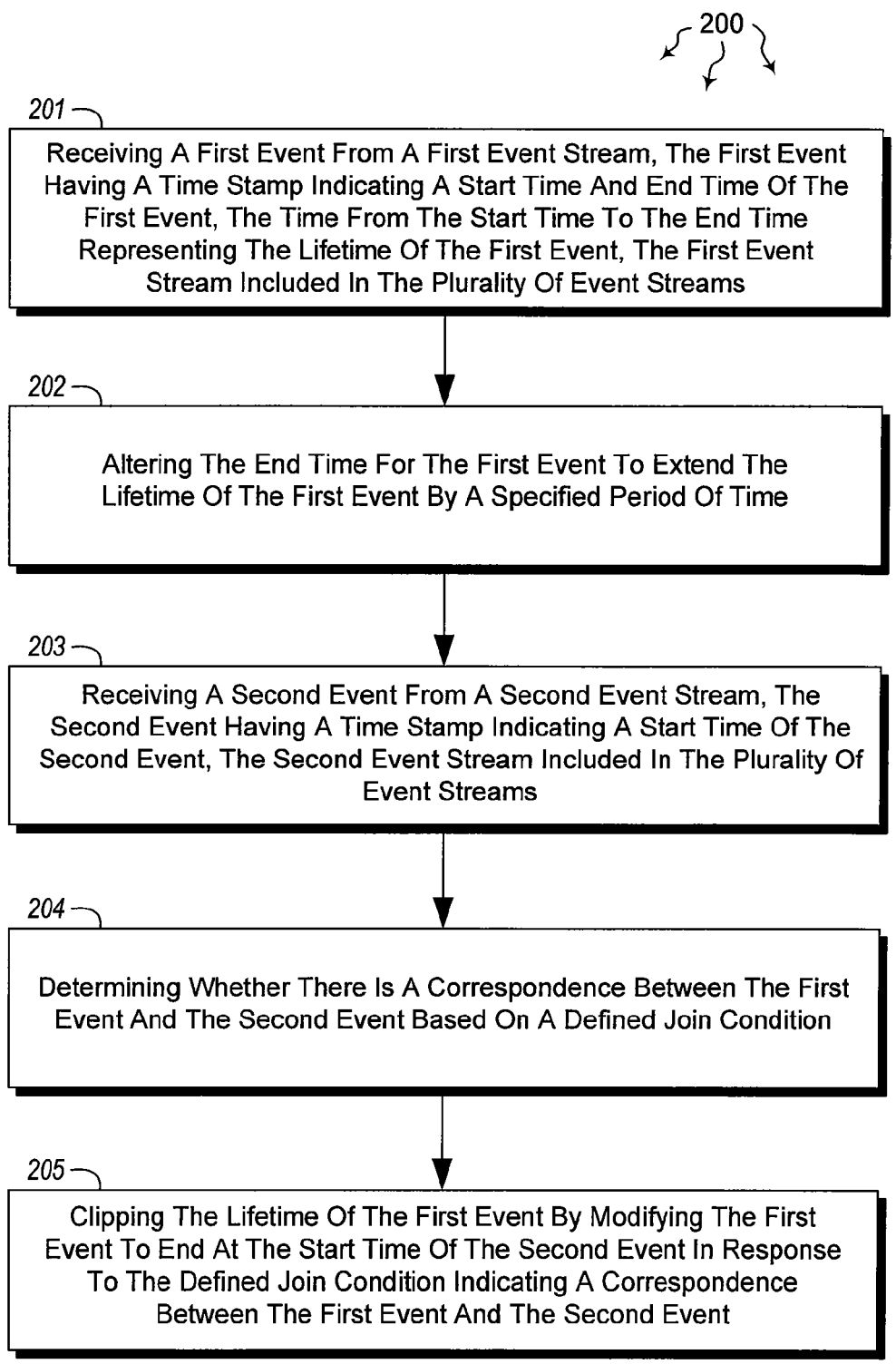
FIG. 2 illustrates a flow chart of an example method for altering event lifetimes.

FIG. 2 illustrates a flow chart of an example method for altering event lifetimes. Method 200 will be described with respect to the components and data of computer architecture 100.

Method 200 includes an act of receiving a first event from a first event stream, the first event having a time stamp indicating a start time and end time of the first event, the time from the start time to the end time representing the lifetime of the first event, the first event stream included in the plurality of event streams (act 201). For example, event processing system 101 can receive events 103A, including events 111A, 112A, and 113A. Each of events 111A, 112A, and 113A can have a time stamp indicating a start time and stop time. The time from the start time to the end time represents the lifetime of the events 111A, 112A, and 113A respectively. Event stream 102A can be one of a plurality of event streams in event processing system 101.

Method 200 includes an act of altering the end time for the first event to extend the lifetime of the first event by a specified period of time (act 202). For example, lifetime extension module 104 can extend the lifetime of events 111A, 112A, and 113A. In some embodiments, lifetime extension module 104 implements an Alter Event Duration operator to extend the lifetime of an event by altering the end time for the event. The Alter Event Duration operator can extend the lifetime of an event by a selected finite amount of time (e.g., 30 seconds, 60 seconds, 10 minutes, etc.) or by an infinite amount of time. An Alter Event Duration operator can be of any of the following formats:

var extended=input.AlterEventDuration (event=>TimeSpan.FromSeconds(60));
    var extended=input.AlterEventDuration (event=>TimeSpan.FromMinutes(10));
    var extended=input.AlterEventDuration (event=>TimeSpan.Infinite( ));

Lifetime extension module 104 can output lifetime extended events 103AE, including events 111AE, 1112AE, and 113AE. Events 111AE, 112AE, and 113AE have the same start times as events 111A, 112A, and 113A and have had their lifetimes extended by altering the end times of events 111A, 112A, and 113A. That is, events 111AE, 1112AE, and 113AE and events 111A, 112A, and 113A represent the same events but 111AE, 1112AE, and 113AE end at a later time than events 111A, 112A, and 113A respectively.

Lifetime extension module 104 can provide lifetime extended events 103AE to clipping module 106.

Method 200 includes an act of receiving a second event from a second event stream, the second event having a time stamp indicating a start time of the second event, the second event stream included in the plurality of event streams (act 203). For example, event processing system 101 can receive events 103A, including events 111B1, 111B2, 112B1, 112B2, and 113B. Each of events 111B1, 111B2, 112B1, 112B2, and 113B can have a time stamp indicating a start time (and potentially also a stop time). Event stream 102B can be one of a plurality of event streams in event processing system 101. Events 103B can be provided to clipping module 106.

Method 200 includes an act of determining whether there is a correspondence between the first event and the second event based on a defined join condition (act 204). For example, clipping module 106 can determine whether there is a correspondence between events in lifetime extended events 103AE and events in events 103B (e.g., whether events correspond to the same session) based on matching condition 113. Method 200 includes an act of clipping the lifetime of the first event by modifying the first event to end at the start time of the second event in response to the defined join condition indicating a correspondence between the first event and the second event (act 205). For example, the lifetime of events in lifetime extended events 103AE can be clipped by modifying the events in lifetime extended events 103AE to end at the start time of events in events 103B in response to matching condition 113 indicating a correspondence.

In some embodiments, a Clip Event Duration operator is used to adjust the lifetime of events with respect to other events. Generally, a Clip Event Duration operator can have three parameters: (i) a "source stream", (ii) a "clip stream", and (iii) a matching condition. For each event in the source stream, the lifetime of the event is truncated to the start time of the next (e.g., in terms of application time) matching event in the clip stream. The matching condition can be a Boolean expression of the payloads of source stream and clip stream. The matching condition can be configured with temporal restrictions such that events in the clip stream that are entirely after the source stream event are not a match. Thus, if the first otherwise matching event occurs entirely after the source stream event or does not exist at all, the source stream event can remain unchanged.

Clip Event Duration operator can be used to create session events, where the beginning and the end of a session is known and encoded as separate events, and can be used to convert a series of points into a continuous signal of intervals.

A Clip Event Duration operator can be of the format:
var result=source stream.ClipEventDuration(clipstream, joincondition);

More specifically, for creating a session event, a Clip Event Duration operator can be of the format:
var clipped=sourcestream.ClipEventDuration(clipstream, (e1, e2)=>e1.Id==e2.Id);

This example takes each event in sourcestream and shortens its lifetime by setting its end time to the start time of the next (in terms of application time) event in clipstream that has the same value of the field Id. If the lifetime of the respective event in stream1 was not long enough to overlap with the next event in stream2 or no matching event exists in stream2, then the event's lifetime remains unchanged.

Clipping module 106 can output clipped events 107.

Figure 1B:
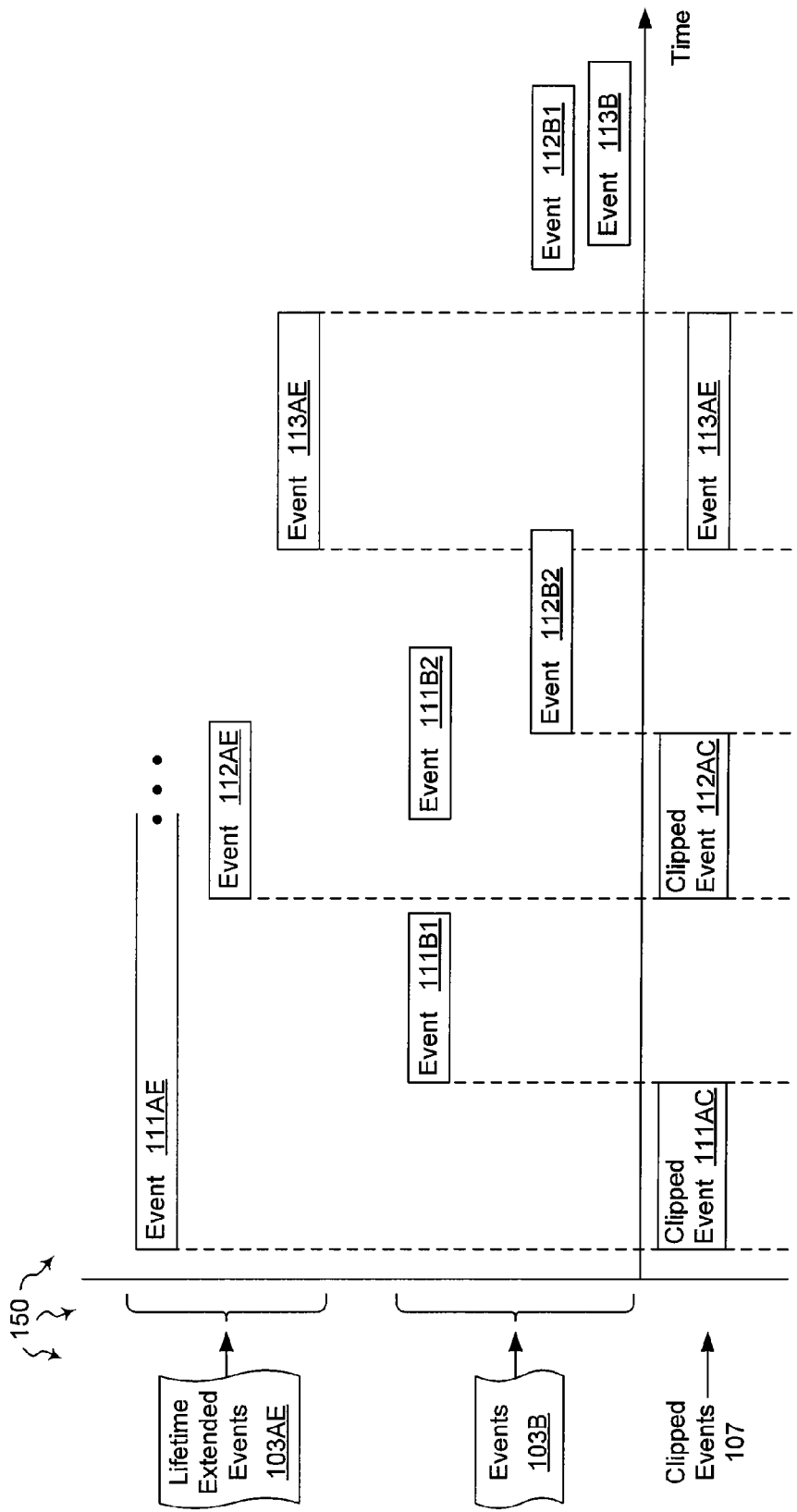
FIG. 1B illustrates a graph of clipped events having alerted lifetimes.

FIG. 1B illustrates a graph 150 of clipped events 107 having altered lifetimes. Within graph 150, events 111AE, 112AE, and 113AE (from lifetime extended events 103AE) and events 111B1, 111B2, 112B1, 112B2, and 113B (from events 103B) are presented. Clipped events 107 includes any events from lifetime extended events 103AE that are clipped to the start time of an event in events 103B

As depicted, the lifetime of event 111AE has been extended infinitely (as represented by the ellipsis). Within events 103B, event 111B1 is the first event (temporally) that matches event 111AE. Thus, the end time for event 111AE is clipped to the start time of event 111B1. Clipped event 111AC is the resulting clipped event. Event 111B2 is ignored because it occurs temporally after event 111B1.

As depicted, the lifetime of event 112AE has been extended for a finite period of time. Within events 103B, event 112B2 is the first event (temporally) that matches event 112AE. Thus, the end time for event 112AE is clipped to the start time of event 111B2. Clipped event 112AC is the resulting clipped event. Event 112B1 is ignored because it occurs temporally after event 111B2.

As depicted, the lifetime of event 113AE has been extended for a finite period of time. Within events 103B, event 113B is the first event (temporally) that matches event 113AE. However, since event 113B starts after event 113AE otherwise ends, event 113B is ignored and 113AE is not clipped. Thus, event 113AE is included unclipped within clipped events 107.

One implementation of ClipEventDuration operator design includes using a Left Anti Semi Join ("LASJ") of the format:
LASJ (input 1, input 2, join predicate).

Generally, LASJ receives a first input (e.g., input 1), a second input (e.g., input 2) and an LASJ predicate (e.g., join predicate). LASJ is a logical operator that returns each row the first input (input 1) when there is no matching row in the second input (input 2). If no LASJ predicate exists each row is a matching row.

One example of achieving a join logically represented by an LASJ is:

```
SELECT * FROM T1 LEFT JOIN T2
    ON T1.foreign_key = T2.key
    WHERE T2.key IS NULL
```

Figure 3:
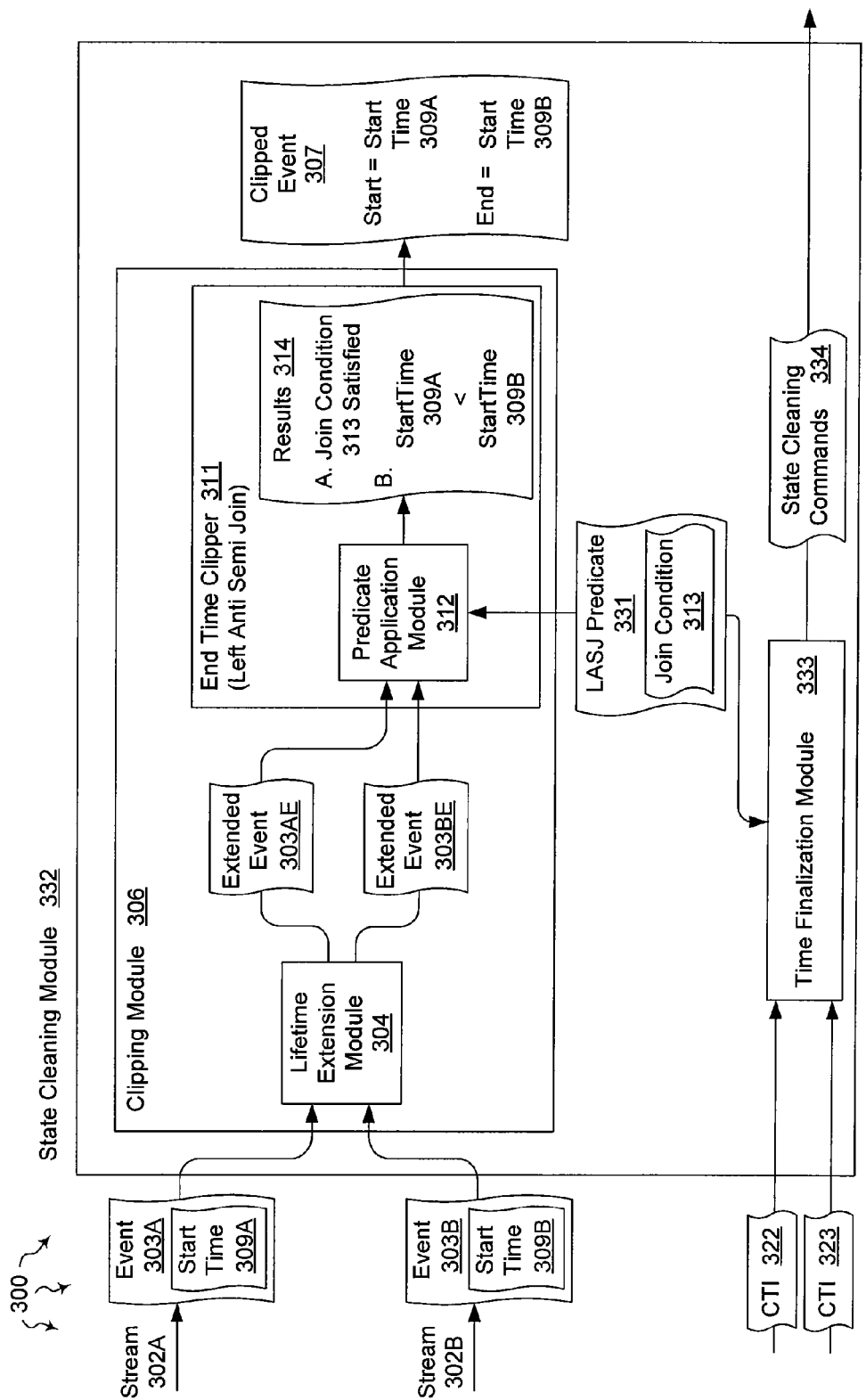
FIG. 3 illustrates an example computer architecture that facilitates cleaning state for event streams.

FIG. 3 illustrates an example computer architecture 300 that facilitates cleaning state for event streams. Referring to FIG. 3, computer architecture 200 includes state cleaning module 332. State cleaning module 332 further includes clipping module 306 and time finalization module. Clipping module 306 further includes lifetime extension module 304 and end time clipper 311. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Streams 302A and 302B can be streaming events to state cleaning module 332. Current time increments ("CTIs") can also be sent to state cleaning module 332. A CTI indicates when events prior to the start time of a specified event are no longer to occur. For example, if an event has a start time of t=6 and a CTI of t=7 (or some later time) is received, then no events prior to the event (temporally) are to be received.

Time finalization module 333 is configured to determine when events are finalized (i.e., can no longer be changed or refracted) based on CTIs.

Figure 4:
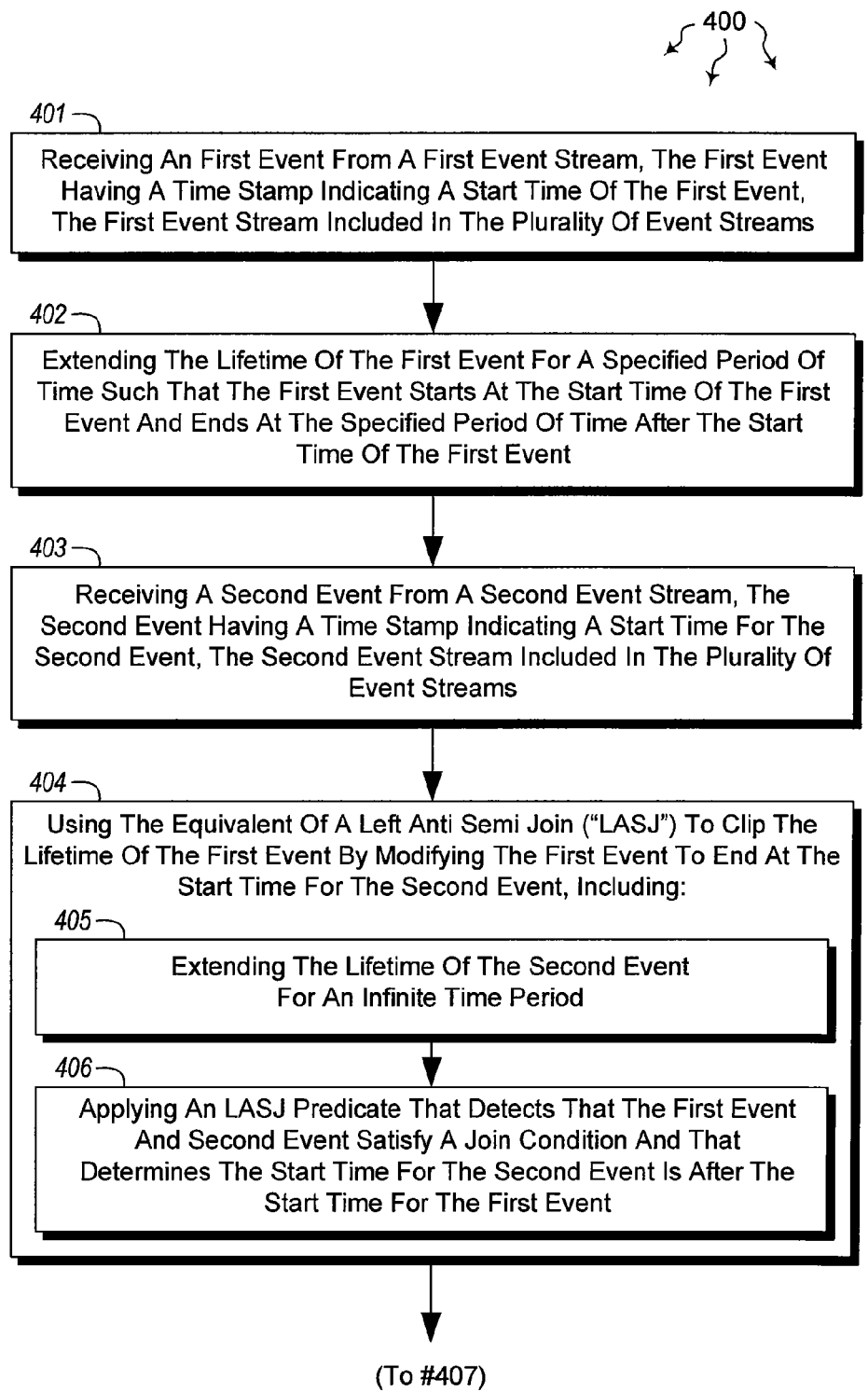
FIG. 4 illustrates a flow chart of an example method for cleaning state for event streams.
Figure 4:
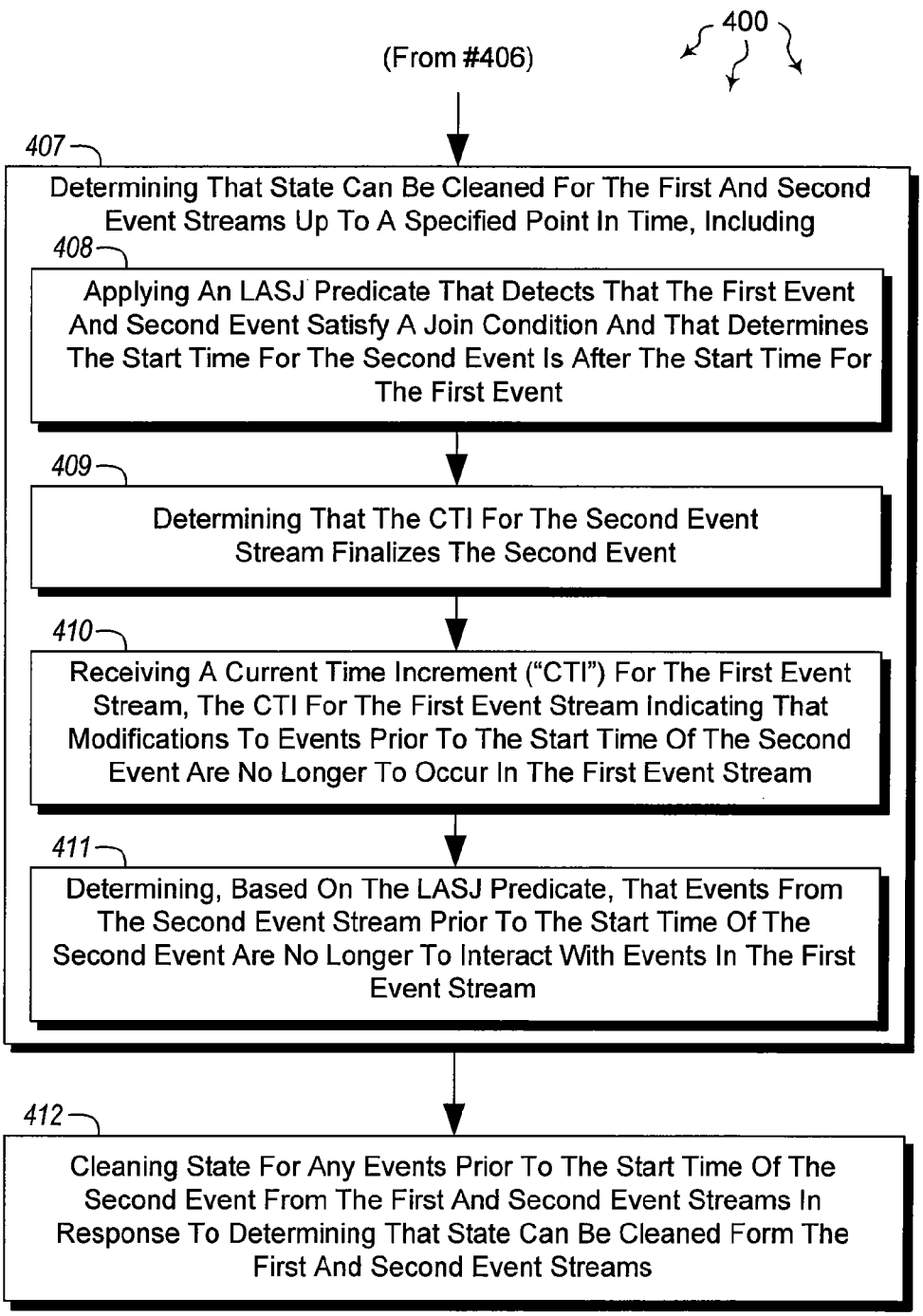

FIG. 4 illustrates a flow chart of an example method 400 for cleaning state for event streams. Method 400 will be described with respect to the components and data of computer architecture 300.

Method 400 includes an act of receiving a first event from a first event stream, the first event having a time stamp indicating a start time of the first event, the first event stream included in the plurality of event streams (act 401). For example, state cleaning module 332 can receive event 303A having start time 309A.

Method 400 includes an act of extending the lifetime of the first event for a specified period of time such that the first event starts at the start time of the first event and ends at the specified period of time after the start time of the first event (act 402). For example, lifetime extension module 304 can generate extended event 303AE from event 303A. Event 303AE can extend the lifetime of event 303A such that event 303A starts at start time 309A and ends a specified period (either finite or infinite) of time after start time 309A.

Method 400 includes an act of receiving a second event from a second event stream, the second event having a time stamp indicating a start time for the second event, the second event stream included in the plurality of event streams (act 403). For example, state cleaning module 332 can receive event 303B having start time 309B.

Method 400 includes an act of using the equivalent of a Left Anti Semi Join ("LASJ") to clip the lifetime of the first event by modifying the first event to end at the start time for the second event (act 404). For example, end time clipper 311 can use the equivalent of an LASJ to clip the lifetime of event 303A to end at start time 309B.

Method 400 includes an act of extending the lifetime of the second event for an infinite time period (act 405). For example, lifetime extension module 304 can generate extended event 303BE from event 303B. Event 303BE can extend the lifetime of event 303B such that event 303B starts at start time 309B and ends a specified period (either finite or infinite) of time after start time 309B.

Method 400 includes an act of applying an LASJ predicate that detects that the first event and second event satisfy a join condition and that determines the start time for the second event is after the start time for the first event (act 406). For example, predicate application module 312 can apply LASJ predicate 331 to extended events 303AE and 303BE. LASJ predicate 331 can detect that extended events 303AE and 303BE satisfy join condition 313 and that the start time for extended event 303BE is after the start time for extended event 303AE In some embodiments, the LASJ operator is represent as:
LASJ(S1, AlterLifetime(S2, $F_{delta}$=Infinity), f AND S1.Vs<S2.Vs)

The first input is S1 (e.g., event 303AE), the second input is AlterLifetime(S2, $F_{delta}$=Infinity)) (where S2 can be event 303BE), and the LASJ predicate is a join condition f and temporal constraint S1.Vs<S2.Vs. For the LASJ to be applied, the join condition f and temporal constraint are to be satisfied S1.Vs<S2.Vs. The join condition f can, for example, defines that two events (e.g., 303AE and 3030BE) be in the same session. To satisfy the temporal constraint, the start time for S1 (e.g., start time 309A) is to be before the start time for S2 (e.g., start time 309B).

When appropriate, end time clipper 311 can output results 314 and/or clipping module 306 can output clipped event 307.

Method 400 includes an act of determining that state can be cleaned for the first and second event streams up to a specified point in time (act 407). For example, state cleaning model 332 can determines that can be cleaned from streams 302A and 302B up to a specified point in time.

Method 400 includes an act of receiving a current time increment ("CTI") for the second event stream, the CTI for the second event stream indicating that modifications to events prior to the start time of the second event are no longer to occur in the second event stream (act 408). For example, time finalization module 333 can receive CTI 323 for stream 302B. CTI 323 indicates that modifications prior to the start time 309B are no long to occur in event stream 302B. Method 400 includes an act of determining that the CTI for the second event stream finalizes the second event (act 409). For example, time finalization module 333 can determine that CTI 323 finalizes event 303B (and thus also 303BE).

Method 400 includes an act of receiving a current time increment ("CTI") for the first event stream, the CTI for the first event stream indicating that modifications to events prior to the start time of the second event are no longer to occur in the first event stream (act 410). For example, time finalization module 333 can receive CTI 322 for stream 302A. CTI 322 indicates that modifications prior to the start time 309B are no long to occur in event stream 302A.

Method 400 includes an act of determining, based on the LASJ predicate, that events from the second event stream prior to the start time of the second event are no longer to interact with events in the first event stream (act 411). For example, time finalization module 333 can determine, based on LASJ predicate 331, that events in the stream 302B prior to start time 309B are no longer to interact with events in stream 302A.

Method 400 includes an act of cleaning state for any events prior to the start time of the second event from the first and second event streams in response to determining that state can be cleaned form the first and second event streams (act 412). For example, state cleaning module 332 can send state cleaning commands 334. State cleaning commands 334 can indicate that state for any events prior to start time 309B can be cleaned form streams 302A and 302B.

Thus generally, in order for an LASJ operator to clean state, the AlterLifetime for S2 is used to deduce that modifications to S2 are not longer possible. This in turn means that once a CTI(punctuation) is received for S2, which is after some event in S2, that event is finalized, and may be used to delete all entries on S1 which are definitely clipped by that event. Similarly, the LASJ predicate ensures that once a CTI on for S1 has been received, events on S2 whose $V_s$ is less than or equal to the associated timestamp may no longer interact with new events on S1, and may therefore be deleted and used to clean the S1 join synopsis as specified above.

Figure 5:
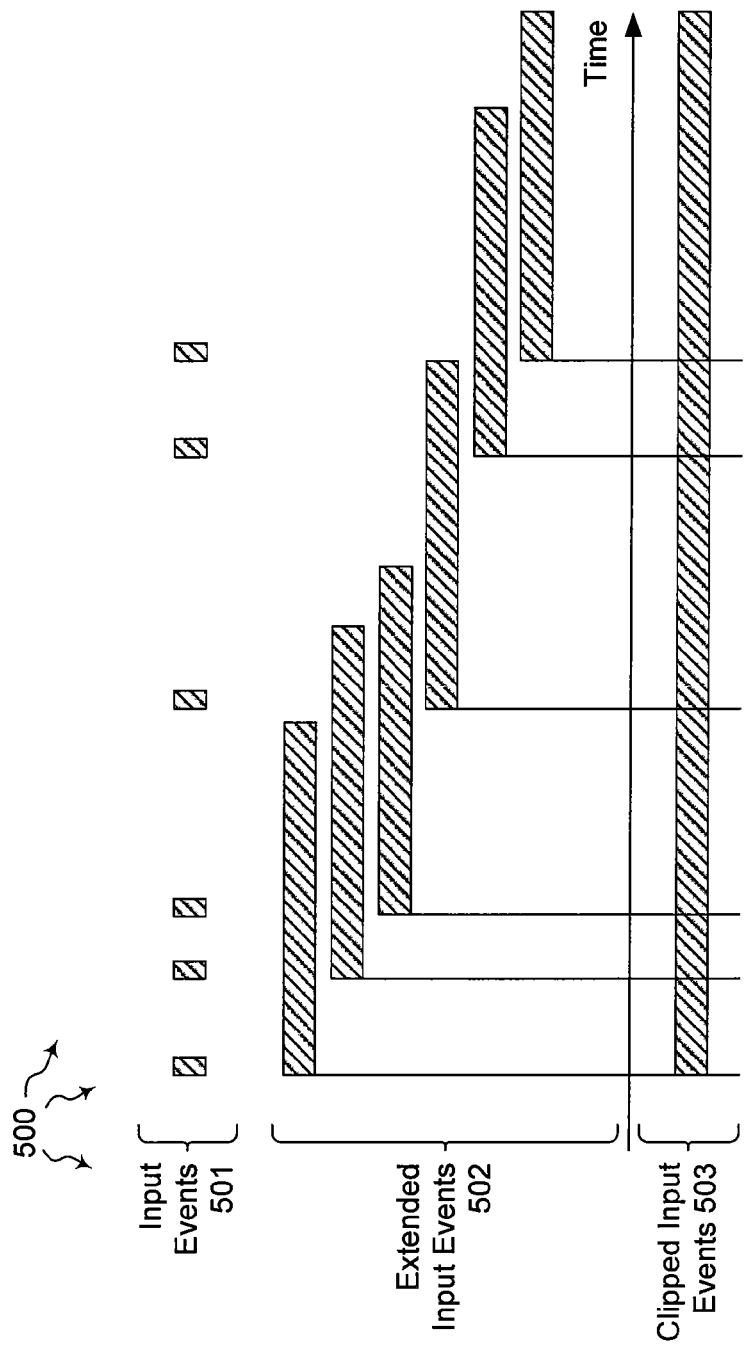
FIG. 5 illustrates a graph of events representing point to signal conversion.

Clipping events can be used for other applications. For example, ClipEventDuraiton can be used to convert a series of point events into a continuous signal, i.e., a series of gapless, non-overlapping interval events. The point events' lifetimes can be extended, so that they reach up to the next event. That is, a timeout is applied that determines how long an event is to maximally last until the next event occurs. The timeout can be a finite time span, such as, for example, 60 seconds, or infinite time span. For example:
var extended=input.AlterEventDuration (e=>TimeSpan.FromSeconds(60));

A ClipEventDuration operator can then be used providing the stream itself as its parameter. As such, each event can be clipped to the next one in the same stream, creating a continuous series of interval events. Since start times of the second stream are used for the clipping operation, the original point stream can be used as the parameter: For example:
var signal=extended.ClipEventDuration(input, (e1, e2)=>true);

FIG. 5 illustrates a graph 500 of events representing point to signal conversion. As depicted in graph 500, input events 501 are extended into extended input events 503. The start of each extended input event 502 is used to clip the preceding event resulting in clipped input events 503 (a continuous signal).

Another use for a ClipEventDuration operator is the creation of session events in order to annotate events that occurred during such a session. Consider the following example event schema, describing events of some user interaction:

```
public class EventType
{
    public int UserId;
    public string Type;
    public DateTime Time;
    public byte[ ] data;
};
```

In this example, the payload field Type can be either "start", "end", or "other", describing the start of a user session, the end of a session, or user events during a session, respectively. The field Time contains the timestamp of the interaction, and data contains further information. This data can be used to annotate each event with the start time of the session during which the event occurred.

A duration expansion according to the timeout can be applied to all events of type "start":

```
var sessionStarts = from e in input
    where e.Type == "start"
    select e;
var sessionStartsExt = sessionStarts.AlterEventDuration(e =>
    TimeSpan.FromMinutes(10));
```

The session events are clipped until their respective end, for each user Id:

```
var sessionEnds = from e in input
    where e.Type == "end"
    select e;
var sessions = sessionStartsExt.ClipEventDuration(sessionEnds,
    (e1, e2) => e1.UserId == e2.UserId);
```

Figure 6A:
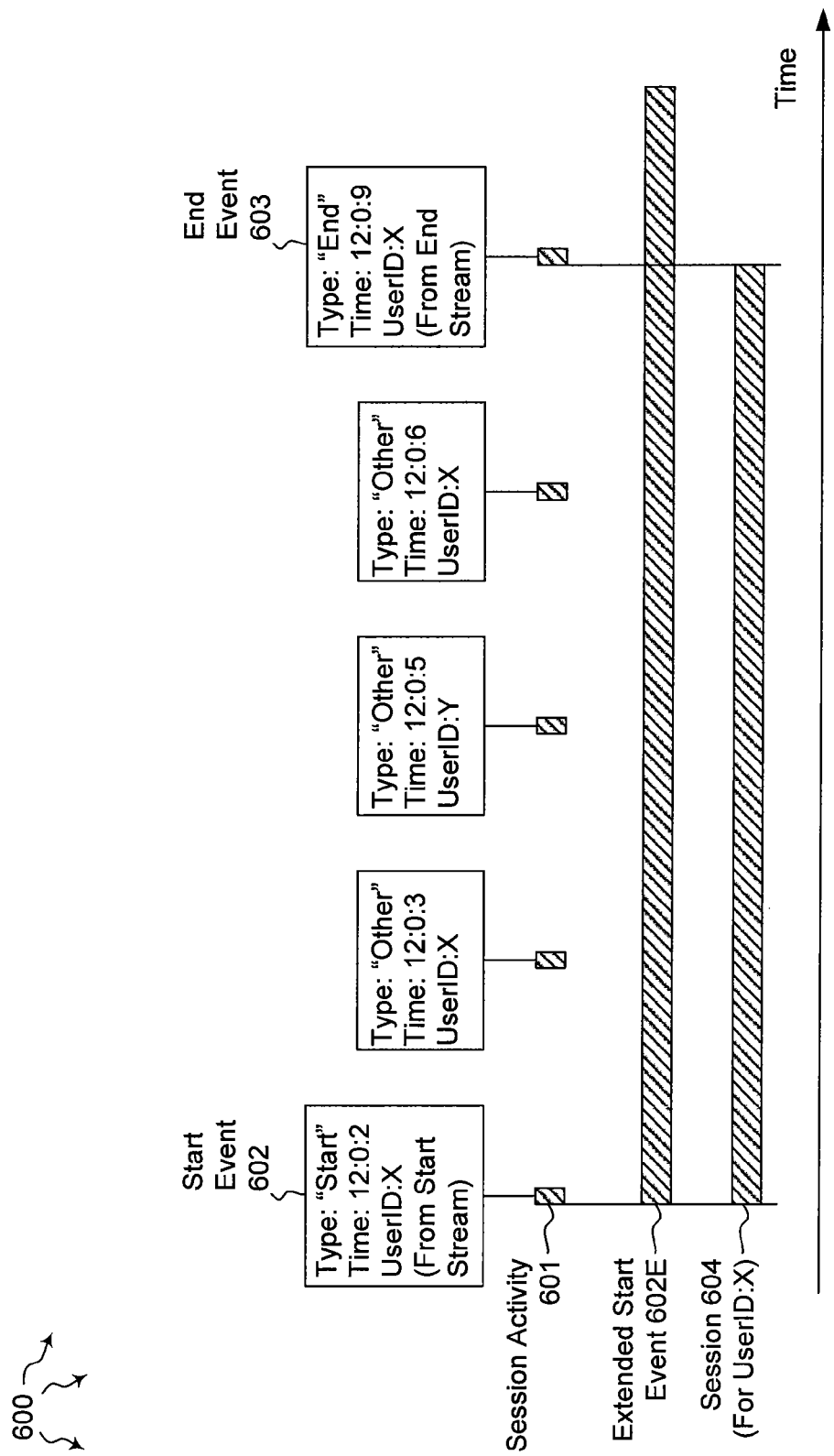
FIG. 6A illustrates a graph of events representing creation of session events.

FIG. 6A illustrates a graph 600 of events representing creation of session events. As depicted, session activity includes start event 602 and end event 603. Extended start event 602E is extended to infinity. The start time of end event 603 is used to clip Extended start event 602E resulting in session 604.

Session events can then be joined to the remaining events:

```
var sessionActivity = from e in input
        where e.Type == "other"
        select e;
var annotated = from s1 in sessions
    join s2 in sessionActivity
    on s1.UserId equals s2.UserId
    select new {
        s2.UserId,
        s2.Type,
        s2.Time,
        s2.Data,
        SessionStart = s1.Time
    }
```

In the join, sessionActivity events are referred ti as well as the fields of the session event. As such, the annotated sessionActivity event can be assembled, pulling in the session start time to each sessionActivity event.

Since the join condition is the equality of UserId, event 606 with UserId=Y in sessionActivity is not taken into account for this specific session with UserId=X.

Figure 6B:
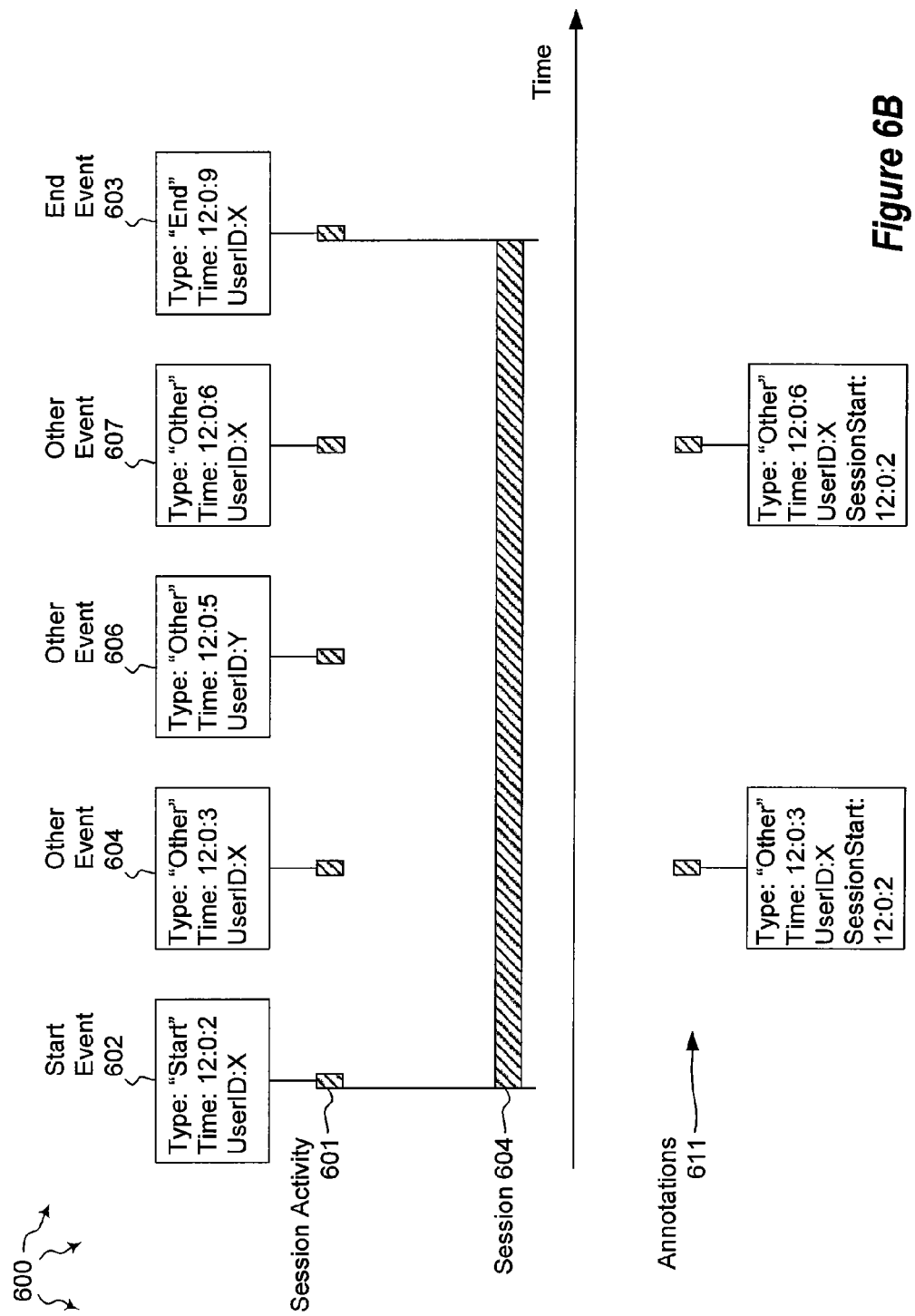
FIG. 6B illustrates a graph of events representing annotating session events with other events.

FIG. 6B illustrates graph 600 of events representing annotating session events with other events. As depicted, other events 604 and 607 are annotated to session 604, as depicted by annotations 611.

Accordingly, embodiments of the invention include using operators in an event-processing framework (algebra) to shorten (or "clip") the duration of events. An operator can receive a primary event stream, a clip event stream, and condition as parameters. The operator clips the lifetime of an event in the primary stream to the next event in the clip stream that fulfills the condition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including stream processing module, the stream processing module configured to process events from a plurality of event streams, a method for adjusting the lifetime of an event in one event stream based on an event in another event stream, the method comprising:

an act of receiving a first event from a first event stream, the first event having a time stamp indicating a start time and end time of the first event, the time from the start time to the end time representing the lifetime of the first event, the first event stream included in the plurality of event streams;

an act of altering the end time for the first event to extend the lifetime of the first event by a specified period of time;

an act of receiving a second event from a second event stream, the second event having a time stamp indicating a start time of the second event, the second event stream included in the plurality of event streams;

an act of determining whether there is a correspondence between the first event and the second event based on a defined join condition, wherein the join condition comprises a temporal restriction which excludes a correspondence between the first event and the second event when the second event is entirely after the first event; and an act of clipping the lifetime of the first event by modifying the first event to end at the start time of the second event in response to the defined join condition indicating a correspondence between the first event and the second event, wherein the act of receiving the second event from the second event stream comprises an act of receiving the second event, wherein the start time of the second event is after the start time of the first event, wherein the act of clipping the lifetime of the event by modifying the first event to end at the start time for the second event comprises an act of using the equivalent of a Left Anti Semi Join ("LASJ") to clip the lifetime of the first event.

2. The method as recited in claim 1, wherein the act of receiving a first event from a first event stream comprises receiving a point event from the first event stream, the point event having a start time and stop time that are the same time.

3. The method as recited in claim 2, wherein the act of altering the end time for the first event to extend the lifetime of the first event by a specified period of time comprises an act of altering the end time for the point event to extend the lifetime of the point event by the specified period of time.

4. The method as recited in claim 1, wherein the act of altering the end time for the first event to extend the lifetime of the first event by a specified period of time comprises an act of altering the end time for the first event to extend the lifetime of the first event by a finite period of time.

5. The method as recited in claim 1, wherein the act of altering the end time for the first event to extend the lifetime of the first event by a specified period of time comprises an act of altering the end time for the first event to extend the lifetime of the first event by a infinite period of time.

6. The method as recited in claim 1, wherein the act of determining whether there is a correspondence between the first event and the second event comprises an act of determining that the first event is a start event and the second event is an end event corresponding to the same session.

7. The method as recited in claim 6, where the act of clipping the lifetime of the first event by modifying the first event to end at the start time of the second event comprises an act of clipping the start event to end at the start time of the end event to create a session event.

8. The method as recited in claim 1, wherein the first event stream and the second event stream are the same specified event stream and wherein the act of clipping the lifetime of the first event by modifying the first event to end at the start time of the second event comprises an act of clipping a first event in the specified event stream with a second event in the specified event stream to generate a continuous signal.

9. A computer program product for use at a computer system including one or more processors and system memory, the computer system also including stream processing module, the stream processing module configured to process events from a plurality of event streams, the computer program product for implementing a method for adjusting the lifetime of an event in one event stream based on an event in another event stream, the computer program product comprising one or more computer storage devices having stored thereon computer-executable instructions that, when executed at a processor, cause the computer system to perform the method including the following:

receive a first event from a first event stream, the first event having a time stamp indicating a start time and end time of the first event, the time from the start time to the end time representing the lifetime of the first event, the first event stream included in the plurality of event streams;

alter the end time for the first event to extend the lifetime of the first event by a specified period of time;

receive a second event from a second event stream, the second event having a time stamp indicating a start time of the second event, the second event stream included in the plurality of event streams;

determine whether there is a correspondence between the first event and the second event based on a defined join condition, wherein the join condition comprises a temporal restriction which excludes a correspondence between the first event and the second event when the second event is entirely after the first event; and clip the lifetime of the first event by modifying the first event to end at the start time of the second event in response to the defined join condition indicating a correspondence between the first event and the second event;

wherein receiving the second event from the second event stream comprises receiving the second event, wherein the start time of the second event is after the start time of the first event; and wherein clipping the lifetime of the event by modifying the first event to end at the start time for the second event comprises using the equivalent of a Left Anti Semi Join (LASJ) to clip the lifetime of the first event.

10. The computer program product as recited in claim 9, wherein computer-executable instructions that, when executed, cause the computer system to receive a first event from a first event stream comprise computer-executable instructions that, when executed, cause the computer system to receive a point event from the first event stream, the point event having a start time and stop time that are the same time.

11. The computer program product as recited in claim 10, wherein computer-executable instructions that, when executed, cause the computer system to altering the end time for the first event to extend the lifetime of the first event by a specified period of time comprise computer-executable instructions that, when executed, cause the computer system to alter the end time for the point event to extend the lifetime of the point event by the specified period of time.

12. The computer program product as recited in claim 9, wherein computer-executable instructions that, when executed, cause the computer system to alter the end time for the first event to extend the lifetime of the first event by a specified period of time comprise computer-executable instructions that, when executed, cause the computer system to alter the end time for the first event to extend the lifetime of the first event by a finite period of time.

13. The computer program product as recited in claim 9, wherein computer-executable instructions that, when executed, cause the computer system to alter the end time for the first event to extend the lifetime of the first event by a specified period of time comprise computer-executable instructions that, when executed, cause the computer system to alter the end time for the first event to extend the lifetime of the first event by a infinite period of time.

14. The computer program product as recited in claim 9, wherein computer-executable instructions that, when executed, cause the computer system to determine whether there is a correspondence between the first event and the second event comprise computer-executable instructions that, when executed, cause the computer system to determine that the first event is a start event and the second event is an end event corresponding to the same session.

15. The computer program product as recited in claim 9, wherein the first event stream and the second event stream are the same specified event stream and wherein computer-executable instructions that, when executed, cause the computer system to clip the lifetime of the first event by modifying the first event to end at the start time of the second event comprise computer-executable instructions that, when executed, cause the computer system to clipping a first event in the specified event stream with a second event in the specified event stream to generate a continuous signal.

16. At a computer system including one or more processors and system memory, the computer system also including stream processing module, the stream processing module configured to process events from a plurality of event streams, a method for cleaning state from event streams, the method comprising:

an act of receiving an first event from a first event stream, the first event having a time stamp indicating a start time of the first event, the first event stream included in the plurality of event streams;

an act of extending the lifetime of the first event for a specified period of time such that the first event starts at the start time of the first event and ends at the specified period of time after the start time of the first event;

an act of receiving a second event from a second event stream, the second event having a time stamp indicating a start time for the second event, the second event stream included in the plurality of event streams;

an act of using the equivalent of a Left Anti Semi Join ("LASJ") to clip the lifetime of the first event by modifying the first event to end at the start time for the second event, including:

an act of extending the lifetime of the second event for an infinite time period; and an act of applying an LASJ predicate that detects that the first event and second event satisfy a join condition and that determines the start time for the second event is after the start time for the first event; and an act of determining that state can be cleaned for the first and second event streams up to a specified point in time, including:

an act of receiving a current time increment ("CTI") for the second event stream, the CTI for the second event stream indicating that modifications to events prior to the start time of the second event are no longer to occur in the second event stream;

an act of determining that the CTI for the second event stream finalizes the second event;

an act of receiving a current time increment ("CTI") for the first event stream, the CTI for the first event stream indicating that modifications to events prior to the start time of the second event are no longer to occur in the first event stream;

an act of determining, based on the LASJ predicate, that events from the second event stream prior to the start time of the second event are no longer to interact with events in the first event stream; and an act of cleaning state for any events prior to the start time of the second event from the first and second event streams in response to determining that state can be cleaned form the first and second event streams.

* * * * *